J. F. PARSONS.
JOINING PIPE.

No. 186,435.     Patented Jan. 23, 1877.

Witnesses:
Geo. H. Graham
John C. Kluber

Inventor:
John Fitch Parsons,
By Munson & Philipp
Attorneys

2 Sheets—Sheet 2.

J. F. PARSONS.
JOINING PIPE.

No. 186,435. Patented Jan. 23, 1877.

Witnesses:
Geo. H. Graham
John C. Kluber

Inventor:
John Fitch Parsons,
by Munson & Philipp
Attorneys.

UNITED STATES PATENT OFFICE.

JOHN F. PARSONS, OF NEW YORK, N. Y.

IMPROVEMENT IN JOINING PIPES.

Specification forming part of Letters Patent No. 186,435, dated January 23, 1877; application filed December 6, 1876.

*To all whom it may concern:*

Be it known that I, JOHN FITCH PARSONS, of the city, county, and State of New York, have invented certain new and useful Improvements in Joining Pipes; and I do hereby declare the following to be a full, clear, and exact description of the same, reference being had to the accompanying drawings, forming a part of this specification.

The object of my invention is to join practically and economically pipes made from any material, whether animal, vegetable, or mineral, for conveying fluids, such as water, gas, compressed air, &c.—first, so as to make a perfectly tight joint, whether any two or more of their lengths be in line or at an angle toward each other, caused by inequalities in the support upon which they rest; second, so that the joint will remain tight, although the lengths of pipe may move after it is formed, caused by the settling of the support on which they rest, such as the settling of the mud or sand in the bottom of the river, or the earth under or around them or the structure—as a bridge—by which they may be supported, or for any other reason; third, so that one or more of their lengths may be removed, if injured, or for any other cause, and another or others substituted without disturbing the other lengths of pipe.

My invention consists in the means, hereinafter described and claimed, whereby the objects above mentioned are attained.

Figure 1:
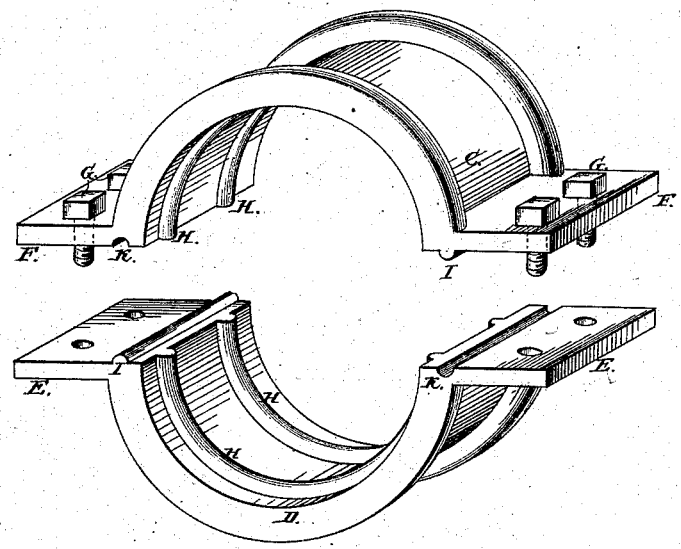
Figure 2:
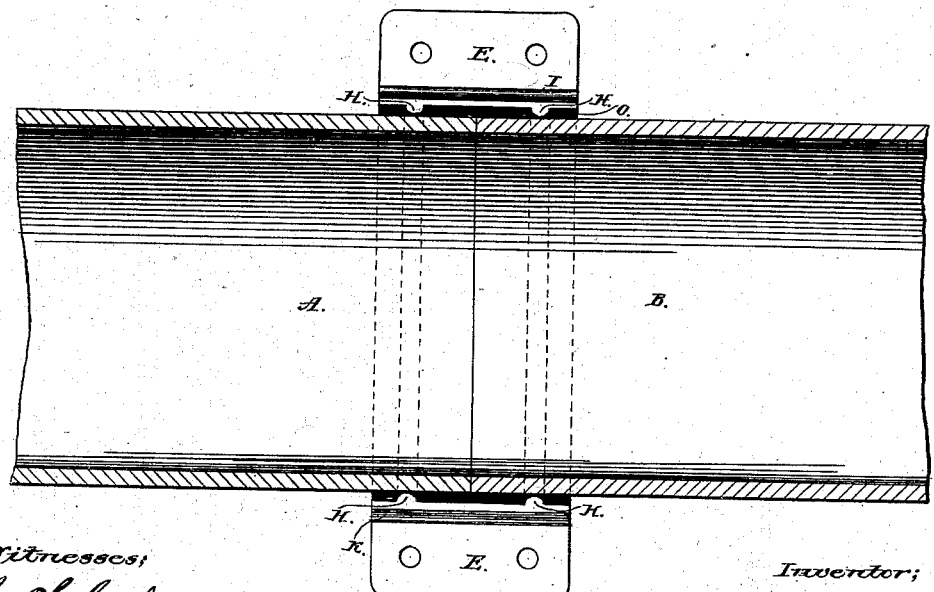
Figure 3:
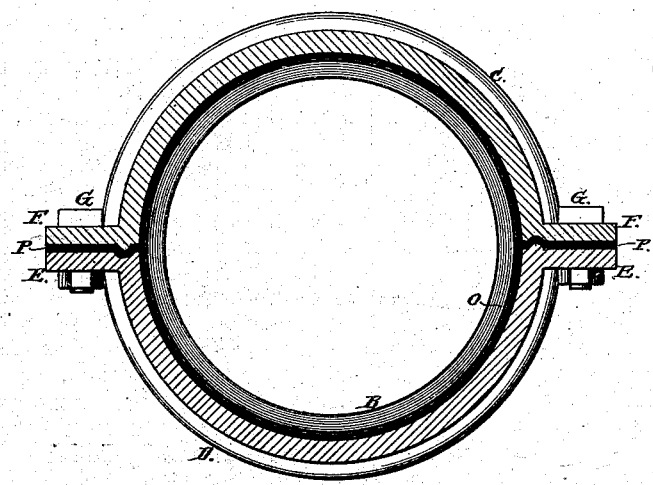
Figure 4:
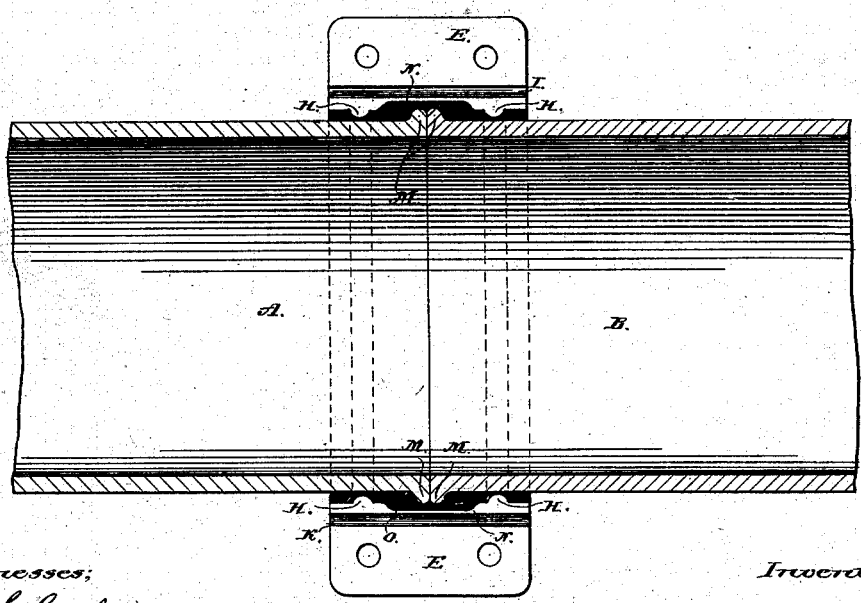

In the drawings, Figure 1 represents a perspective view of the clamps employed to carry out my invention. Fig. 2 is a longitudinal section of two pipes and means for joining them embodying my invention. Fig. 3 is a transverse section of the same. Fig. 4 is a vertical longitudinal section of a modification of the same.

A B represent two lengths of pipe, the exterior surfaces of their contiguous ends, where the packing is to be applied, being cylindrical, as shown. C D represent two clamps, which serve to join the pipes together. These are provided with ears E F, having bolt-holes and bolts G and nuts, in the usual manner. These clamps are provided with internal beads H, of the same form as the exterior surface of the contiguous ends of the pipes, where the packing is to be placed, and somewhat larger in diameter, when the clamps are bolted together, than said pipes. These beads are so located that one or more of them will be on each side of the abutting ends of the pipes when the clamps are bolted together. These clamps are also provided with projections I and recesses K on the ears E F, the projection on the ear of the one clamp coming opposite the recess in the ear of the other. Both projections may be upon the ears of the one clamp, and both recesses upon the ears of the other clamp, if desired. O is a packing of lead, or any other suitable material for making joints, which is placed about the ends of the pipes, of a width greater than the distance between the beads H, its ends, either straight or beveled, overlapping. P are short pieces of lead, or other suitable packing material for making joints, about the width of the ears E F, and placed between them, so that one edge shall abut against the packing O.

In joining the pipes A B, their ends are brought together, the lead or other packing O is bent around the joint, and its ends overlapped. The clamps C D are then placed about the ends of the pipes, over the packing O, and the pieces of packing P are placed snugly against the packing O, between the ears of the clamps. The bolts G are then put in place and screwed up, causing the beads H to press about the packing and force it against the cylindrical surface of the pipes A B. As the clamps are forced together a small portion of the packing O will protrude between the ears E F, and the pieces of packing P will be forced in contact therewith, being also forced by the projections I into recesses K, to prevent them from slipping and afford a firm support for that portion of the packing O that protrudes between the ears E F.

As the packing-surface of the pipe is cylindrical, and the portion of the packing that makes the joint is in the form of a bead, the pipe can move longitudinally or angularly without destroying the joint.

As the clamp is in two parts, it can be readily removed if, from any cause, it is desirable to substitute a length of pipe for one already joined.

When the pipes are to be used to convey any fluid other than compressed air or gas, the pieces of packing P may be dispensed with, as the portion of the packing O that protrudes between the ears E F of the clamps when the latter come together, so as to leave a small space, will be so compressed as to form a tight joint at that point.

When the pieces of packing P are not used, the projections I and recesses K may be dispensed with and the inner surfaces of the ears E F made plain.

When the pipes to be joined are to be laid in water, as on the bed of a river, beads M M are formed on their ends, and an annular recess, N, is made in the clamps, as shown in Fig. 4, so that the pipes as they move cannot slip out of the clamp, the beads M H and walls of the recess N preventing this.

The clamps may be made in more than two parts, if desired, without departing from my invention.

By these means a perfectly-tight joint is formed, whether the pipes are in line or at an angle to each other, which remains tight, although the pipe may move after it is formed, and one or more lengths can be substituted for those already joined without disturbing the other lengths. These means are economical, and have been practically tried with success.

Having thus fully described my invention, what I claim as new, and desire to secure by Letters Patent, is—

1. The combination of the clamps, provided with internal beads, with suitable packing, and the cylindrical ends of the pipes to be joined, substantially as shown and described.

2. The combination of the clamps, provided with internal beads, and projections and recesses on their ears, with suitable packing and the cylindrical ends of the pipes to be joined, substantially as shown and described.

3. The combination of the clamps, provided with internal beads, and with or without the projections and recesses on their ears, and with an internal recess of suitable packing, with the cylindrical ends of the pipes to be joined, provided with beads, substantially as shown and described.

In testimony whereof I have signed my name to this specification in the presence of two subscribing witnesses.

JOHN FITCH PARSONS.

Witnesses:
  M. B. PHILIPP,
  JOHN C. KLUBER.